(12) United States Patent
Suzuki et al.

(10) Patent No.: US 10,724,859 B2
(45) Date of Patent: Jul. 28, 2020

(54) DISTANCE-MEASURING DEVICE

(71) Applicant: SONY INTERACTIVE ENTERTAINMENT INC., Tokyo (JP)

(72) Inventors: Akira Suzuki, Tokyo (JP); Manabu Ishioka, Tokyo (JP); Hidehiko Ogasawara, Tokyo (JP); Yasuhiro Watari, Tokyo (JP); Masao Shimizu, Tokyo (JP); Takayuki Ishida, Tokyo (JP); Toshihiro Kusunoki, Tokyo (JP); Yuichiro Nakamura, Redwood City, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 154 days.

(21) Appl. No.: 15/775,062

(22) PCT Filed: Aug. 1, 2016

(86) PCT No.: PCT/JP2016/072529
§ 371 (c)(1),
(2) Date: May 10, 2018

(87) PCT Pub. No.: WO2017/094285
PCT Pub. Date: Jun. 8, 2017

(65) Prior Publication Data
US 2018/0328727 A1    Nov. 15, 2018

(30) Foreign Application Priority Data

Dec. 1, 2015 (JP) ................................. 2015-234592

(51) Int. Cl.
*G01C 3/06* (2006.01)
*G03B 35/08* (2006.01)
(Continued)

(52) U.S. Cl.
CPC ............... *G01C 3/06* (2013.01); *G03B 35/08* (2013.01); *H04N 13/239* (2018.05);
(Continued)

(58) Field of Classification Search
CPC ........ G01C 2011/36; G01C 3/06; G01C 3/14; G03B 35/08; H04N 13/239; H04N 13/243;
(Continued)

(56) References Cited

U.S. PATENT DOCUMENTS 7,429,997 B2 *   9/2008   Givon .................... G03B 35/00
                                                                  348/46
2017/0076429 A1 * 3/2017   Russell ................. G06T 3/4038

FOREIGN PATENT DOCUMENTS

JP          61-75265 A      4/1986
JP        2001-211403 A     8/2001
(Continued)

OTHER PUBLICATIONS

International Preliminary Report on Patentability dated Jun. 5, 2018, from the corresponding International Application No. PCT/JP2016/072529, 13 sheets.
(Continued)

*Primary Examiner* — Hina F Ayub
(74) *Attorney, Agent, or Firm* — Katten Muchin Rosenman LLP

(57) ABSTRACT

A distance-measuring device includes first and second stereoscopic cameras each to be used to measure the distance to an object included in an imaging range. The first stereoscopic camera includes two imaging elements arranged side by side in a first direction, and the second stereoscopic camera includes two imaging elements arranged side by side in a second direction. The second direction is defined as a direction which intersects a plane containing the first direc-
(Continued)

tion and an imaging direction of the first stereoscopic camera.

3 Claims, 7 Drawing Sheets

(51) Int. Cl.
  *H04N 13/271* (2018.01)
  *H04N 13/239* (2018.01)
  *H04N 13/30* (2018.01)
  *H04N 13/344* (2018.01)
  *H04N 13/243* (2018.01)
  *G01C 11/36* (2006.01)

(52) U.S. Cl.
  CPC ........... *H04N 13/271* (2018.05); *H04N 13/30* (2018.05); *H04N 13/344* (2018.05); *G01C 2011/36* (2013.01); *H04N 13/243* (2018.05)

(58) Field of Classification Search
  CPC .... H04N 13/271; H04N 13/30; H04N 13/344; H04N 13/332; H04N 2213/008; G02B 21/22; G02B 30/00; G01N 2223/414
  See application file for complete search history.

(56) References Cited

FOREIGN PATENT DOCUMENTS

| | | |
|---|---|---|
| JP | 2001-285692 A | 10/2001 |
| JP | 2007-525054 A | 8/2007 |
| JP | 2011-24079 A | 2/2011 |
| WO | 2004/109385 A2 | 12/2004 |

OTHER PUBLICATIONS

International Search Report and Written Opinion dated Oct. 18, 2016, from the corresponding International Application No. PCT/JP2016/072529, 10 sheets.

\* cited by examiner

US 10,724,859 B2

DISTANCE-MEASURING DEVICE

TECHNICAL FIELD

The present invention relates to a distance-measuring device to be used to measure the distance to an object around the device.

BACKGROUND ART

There is known a technique to measure the distance to a subject with the help of a stereoscopic camera having a plurality of cameras arranged side by side. This stereoscopic camera may be mounted on a device such as head-mounted display so as to measure the distance to an object around the device.

SUMMARY

Technical Problem

The device mentioned above needs a plurality of cameras surrounding it in the case where it is desirable to measure distances to objects widely scattering (right and left and front and rear) around it. Unfortunately, the stereoscopic cameras arranged side by side do not completely cover the region between the adjacent cameras, which is likely to leave the dead angles which hamper the distance measurement.

The present invention has been completed in view of the foregoing. It is an object of the present invention to provide a distance-measuring device capable of measuring the distance to objects around the device, with dead angles comparatively limited.

Solution to Problem

A distance-measuring device according to the present invention includes first and second stereoscopic cameras each to be used to measure the distance to an object included in an imaging range. The first stereoscopic camera contains two imaging elements arranged side by side along a first direction, and the second stereoscopic camera contains two imaging elements arranged side by side along a second direction. The second direction is so oriented as to intersect a plane containing the first direction and an imaging direction of the first stereoscopic camera.

DESCRIPTION OF EMBODIMENTS

In what follows, embodiments of the present invention will be described in more detail with reference to the accompanying drawings.

First Embodiment

Figure 1:
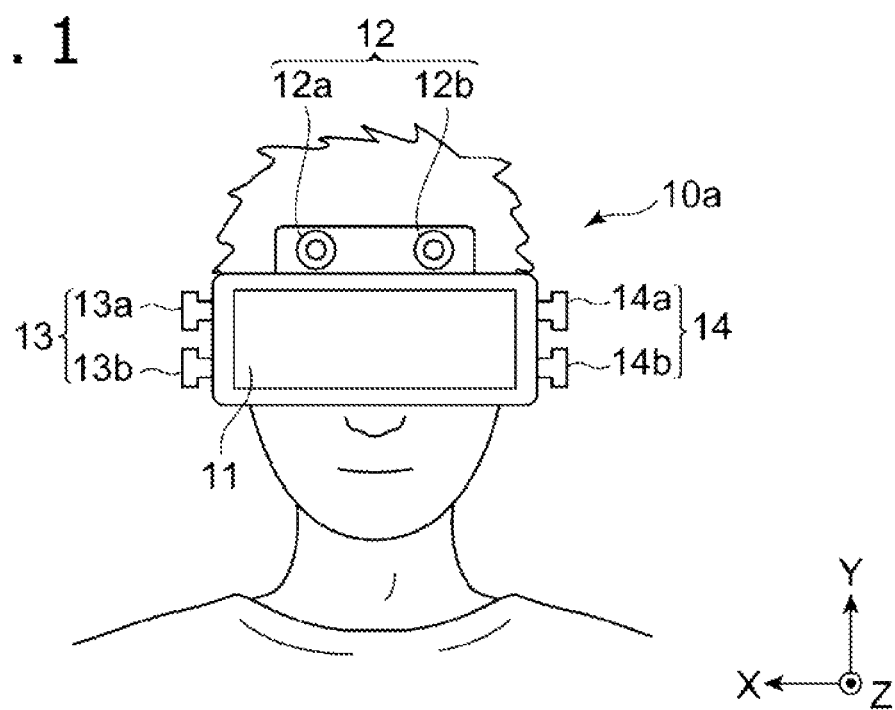
FIG. 1 is a front view depicting how a user wears a distance-measuring device according to a first embodiment of the present invention.
Figure 2:
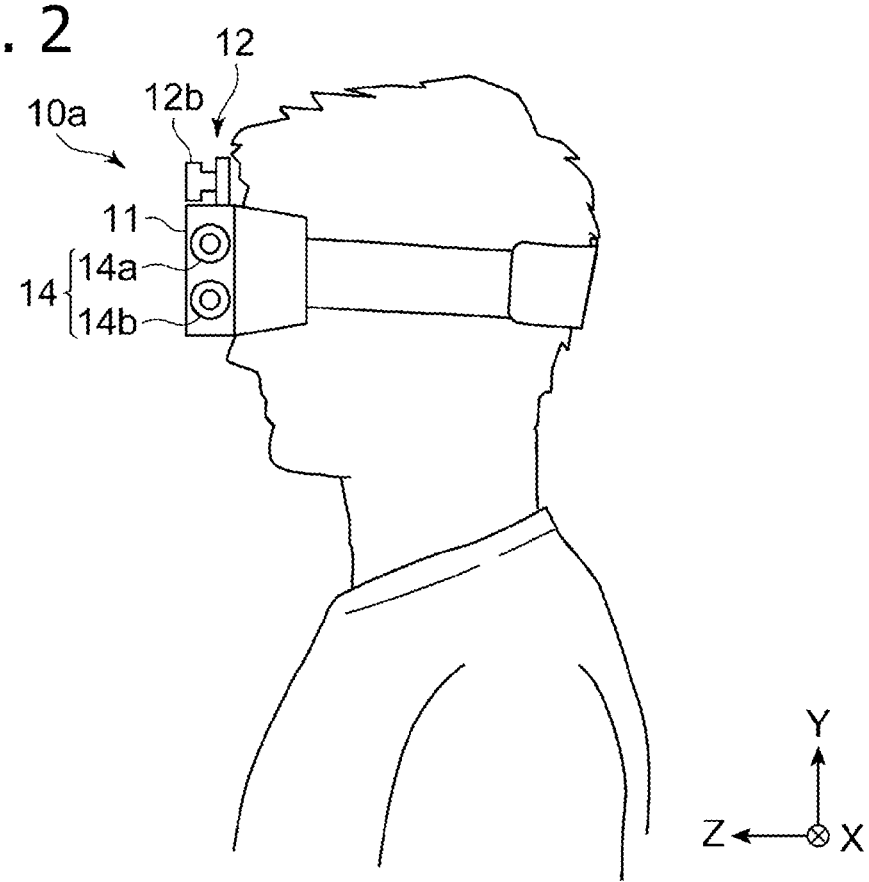
FIG. 2 is a left side view depicting how the user wears the distance-measuring device according to the first embodiment of the present invention.

FIGS. 1 and 2 are a front view and a left side view each depicting how a user wears a distance-measuring device 10a according to the first embodiment of the present invention. The distance-measuring device 10a according to the present embodiment is an image-displaying apparatus which the user wears on his or her head. The distance-measuring device 10a captures images around it while it is presenting an image to the user. The thus captured images are used to measure the distance to an object existing around the distance-measuring device 10a. The distance-measuring device 10a includes an image-presenting unit 11, a front stereoscopic camera 12, a right-side stereoscopic camera 13, and a left-side stereoscopic camera 14.

It is assumed for convenience's sake in the following description that the distance-measuring device 10a has a lateral direction, a vertical direction, and a depthwise direction, which are defined respectively as an X-axis direction, a Y-axis direction, and a Z-axis direction. The X-axis direction, Y-axis direction, and Z-axis direction correspond respectively to a right-left direction, an up-down direction, and a front-rear direction of the user wearing the distance-measuring device 10a. Also, the user's rightward direction, upward direction, and frontward direction are defined respectively as positive directions of X-axis, Y-axis, and Z-axis.

The image-presenting unit 11 presents an image to the user wearing the distance-measuring device 10a in front of his or her eyes. The image-presenting unit 11 is composed of a liquid-crystal display element and an optical system, for example, so that the image displayed on the liquid-crystal display element is introduced to the user's eyes through the optical system, thereby projecting the image on the user's eyes. Thus the user can see the stereo image presented by the image-presenting unit 11.

The front stereoscopic camera 12 is arranged on the front side of the distance-measuring device 10a or on the user's front side when the user wears the distance-measuring device 10a. To be more specific, according to the present embodiment, the front stereoscopic camera 12 is arranged above the image-presenting unit 11. The front stereoscopic camera 12 includes two imaging elements 12a and 12b arranged so as to face the positive direction of the Z-axis. Consequently, the front stereoscopic camera 12 is positioned such that the positive direction of the Z-axis coincides with the imaging direction. The two imaging elements 12a and 12b are arranged side by side, a certain distance apart in the direction of the X-axis. The term "baseline's lengthwise direction" is used in the following to specify the direction in which the two imaging elements constituting the stereoscopic camera are arranged side by side. The front stereoscopic camera 12 has the baseline's lengthwise direction which coincides with the direction of the Y-axis. In addition, the front stereoscopic camera 12 has the baseline's lengthwise direction which coincides approximately with the horizontal direction at the time of use and also with the direction in which the user's eyes align.

The front stereoscopic camera 12 works to measure the distance to an object in front of the user. To be more concrete, the two imaging elements 12a and 12b capture an image in which the images of the same object appear at different positions due to their parallax. This parallax varies in magnitude depending on the distance from the front stereoscopic camera 12 to the object. This makes it possible to determine the distance to the object captured in the image by analysis of the image captured by the two imaging elements 12a and 12b. In other words, the image captured by the front stereoscopic camera 12 yields an image (or depth map) indicating the distance in the front direction from the distance-measuring device 10a. This depth map covers substantially the area of the user's visual field, and hence it indicates the distance to any object that will be covered by the user's visual field. It is not necessary for the distance-measuring device 10a to determine the distance and generate the depth map, but such operations may be accomplished by any information processing apparatus, such as personal computer and domestic game machine, connected to the distance-measuring device 10a.

The right-side stereoscopic camera 13 and left-side stereoscopic camera 14 each include two imaging elements as in the case of the front stereo camera 12. Therefore, they are used individually to make the depth map in the right and left directions. The imaging range captured by the side cameras is contiguous to the imaging range captured by the front stereoscope camera 12.

The right-side stereoscopic camera 13 has the imaging direction coinciding with the positive direction of the X-axis, which is equivalent to the user's right direction. The right-side stereoscopic camera 13 includes two imaging elements 13a and 13b, which are arranged in the direction of the Y-axis, unlike the front stereoscopic camera 12 which has the baseline's lengthwise direction parallel to the horizontal plane. In other words, the right-side stereoscopic camera 13 is arranged such that the front stereoscopic camera 12 is rotated at right angles in its horizontal plane (XZ plane) and further rotated at right angles in the perpendicular plane XY plane).

The left-side stereoscopic camera 14 is also arranged in the same way as the right-side stereoscopic camera 13; in other words, it is arranged such that the baseline's lengthwise direction coincides with the direction of the Y-axis and two imaging elements 14a and 14b are arranged side by side in the direction of the Y-axis. Incidentally, the left-side stereoscopic camera 14 has the imaging direction coinciding with the negative direction of the X-axis, and the left-side stereoscopic camera 14 is arranged symmetrically with the right-side stereoscopic camera 13.

The arrangement in this manner reduces the dead angle, which is not covered by the stereoscopic camera, more than the stereoscopic cameras which have the baseline's lengthwise direction contained in the horizontal plane. This will be described below.

Figure 3:
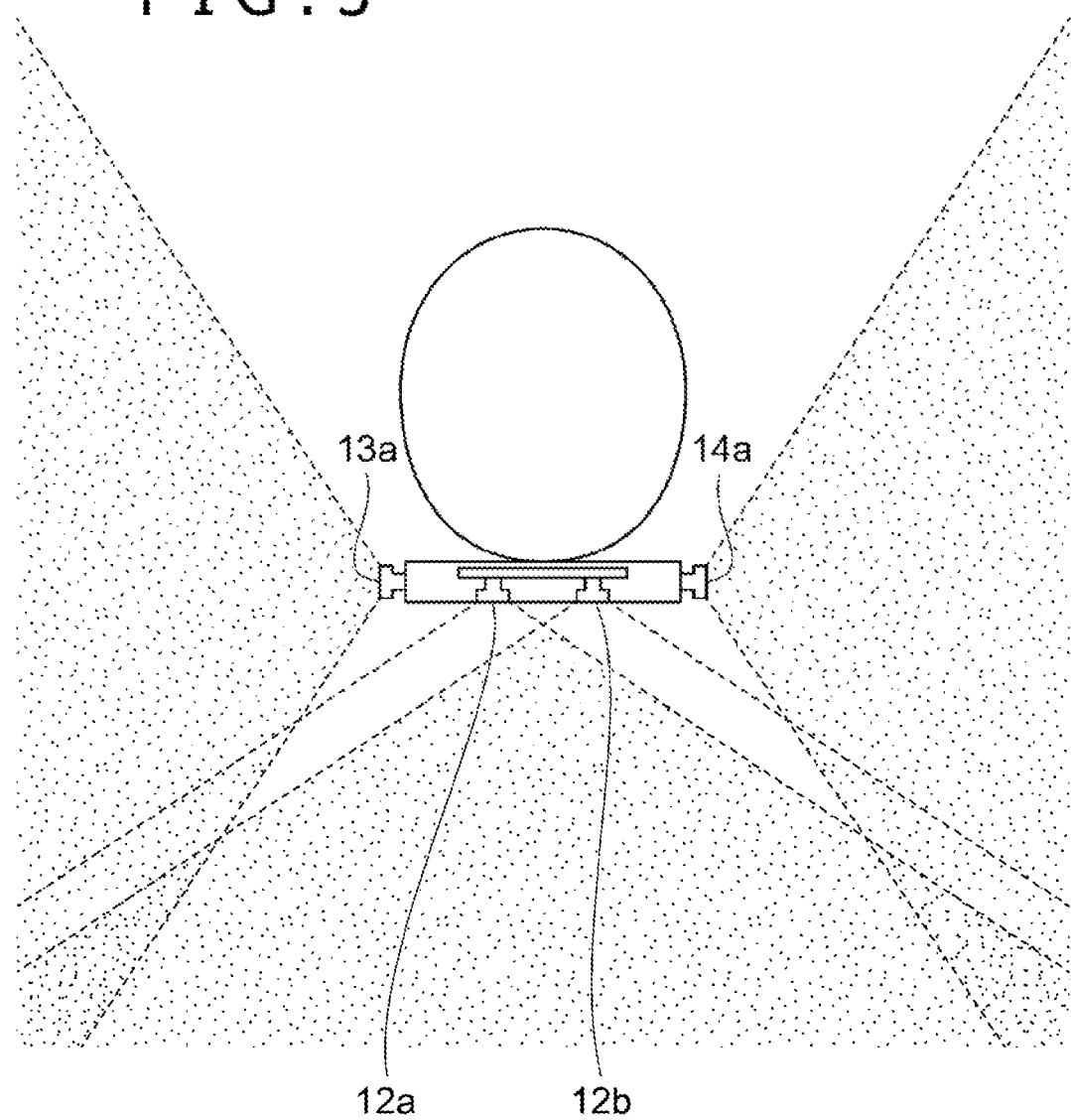
FIG. 3 is a diagram depicting a range for measurement by the distance-measuring device according to the first embodiment of the present invention.
Figure 3:
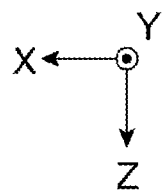

FIG. 3 is a diagram depicting the distance-measuring device 10a viewed from above. It indicates the range of the distance that can be determined by the distance-measuring device 10a. The broken lines in the figure indicate the imaging range covered by each imaging element of the front stereoscopic camera 12, the right-side stereoscopic camera 13, and the left-side stereoscopic camera 14. The area in which the imaging ranges of the two imaging elements constituting each stereoscopic camera overlap with each other is the range in which the distance can be measured. Incidentally, the range in which the distance can be measured is indicated by hatching. There is a range which cannot be imaged by any stereoscopic camera and also there is a range which can be imaged only by either of the two imaging elements constituting the stereoscopic camera. Such a range is the dead angle. Incidentally, according to the present embodiment, the two side stereoscopic cameras have the baseline's lengthwise direction which intersects with the horizontal plane; therefore, the imaging ranges of the two imaging elements constituting each of the side stereoscopic cameras coincide with each other in the horizontal plane.

Figure 4:
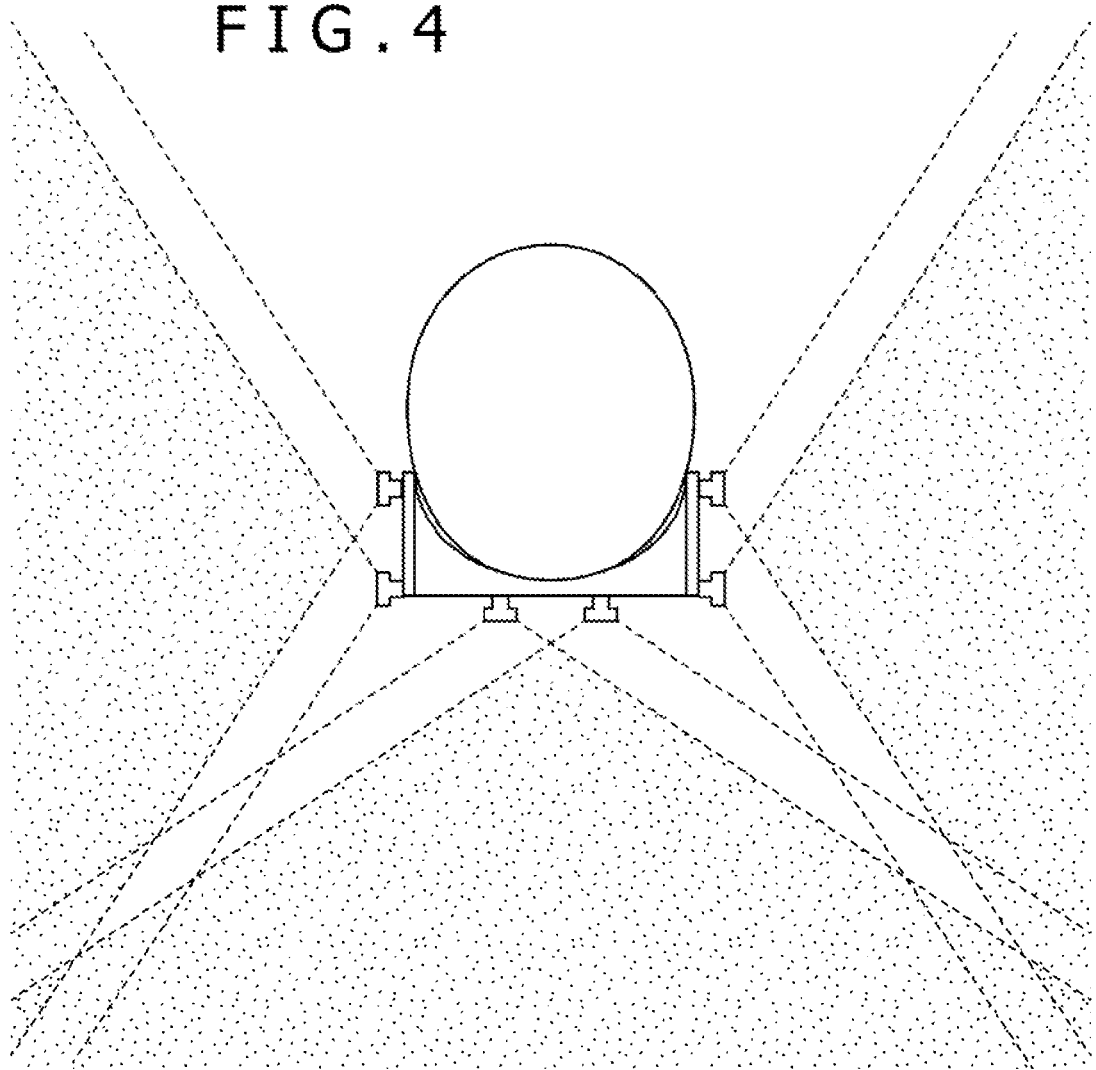
FIG. 4 is a diagram depicting an example of the range for measurement by the distance-measuring device which has a plurality of stereoscopic cameras arranged such that their baseline's lengthwise directions are contained in the same plane.
Figure 4:
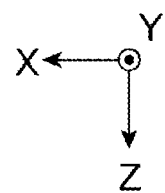

For the sake of comparison, FIG. 4 depicts the range in which the distance can be measured, in which case a plurality of stereoscopic cameras are arranged such that their respective baseline's lengthwise directions are contained in the same plane. In the case where a plurality of cameras are arranged in the same plane, it is necessary for the two imaging elements constituting each stereoscopic camera to be arranged a certain distance apart; therefore, the stereoscopic cameras adjacent to each other are separated. The result is that there occurs a large dead angle in which the distance cannot be measured by any one of the adjacent stereoscopic cameras. This is not the case for the present embodiment depicted in FIG. 3, in which the adjoining right-side stereoscopic cameras 13 and the adjoining left-side stereoscopic cameras 14 are arranged such that the baseline's lengthwise directions of both set intersect the plane (horizontal plane, in this case) containing the imaging direction and the baseline's lengthwise direction of the front stereoscopic camera 12. Consequently, it is possible to reduce the dead angle between the front stereoscopic camera 12 and the right-side stereoscopic camera 13 and the dead angle between the front stereoscopic camera 12 and the left-side stereoscopic camera 14 more than depicted in FIG. 4 (which is a plan view).

Second Embodiment

The following is a description of a distance-measuring device 10b pertaining to the second embodiment of the present invention. The second embodiment has something in common with the first embodiment except that the right-side stereoscopic camera 13 and the left-side stereoscopic camera 14 are arranged differently from those in the first embodiment. The common constituent elements are given the same reference symbols, with their detailed explanation omitted.

The second embodiment is characterized in that the right-side stereoscopic camera 13 and the left-side stereoscopic camera 14 have the imaging direction which deviates from the user's side direction and points toward the direction close to the front direction. To be more concrete, the right-side stereoscopic camera 13 has its imaging direction deviated to the positive direction of Z-axis by 30° from the positive direction of X-axis. Also, the left-side stereoscopic camera 14 has its imaging direction deviated to the positive direction of Z-axis by 30° from the negative direction of X-axis. However, each of the side stereoscopic cameras has its baseline's lengthwise direction coincide with the direction of Y-axis as in the case of the first embodiment.

Figure 5:
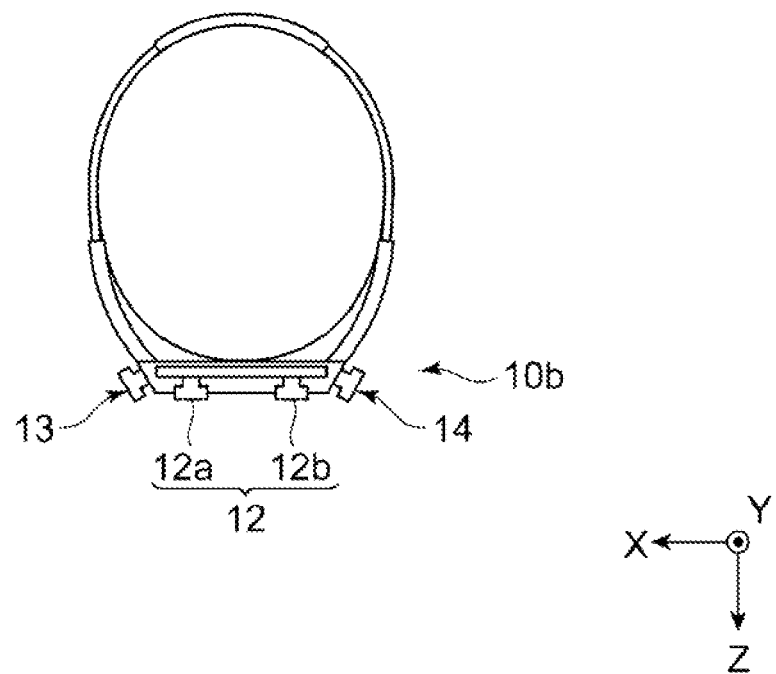
FIG. 5 is a top view depicting how a user wears a distance-measuring device according to a second embodiment of the present invention.

FIG. 5 is a top view depicting how the user wears the distance-measuring device 10b according to the second embodiment. It is to be noted from FIG. 5 that the two side stereoscopic cameras have their imaging direction turned toward the front, in the present embodiment. This arrangement reduces the dead angle between the front stereoscopic camera 12 and each of the side stereoscopic cameras more than in the case of the first embodiment.

Third Embodiment

The following is a description of a distance-measuring device 10c pertaining to the third embodiment of the present invention. The third embodiment has something in common with the first embodiment except that the right-side stereoscopic camera 13 and the left-side stereoscopic camera 14 are arranged differently from those in the first embodiment.

Figure 6:
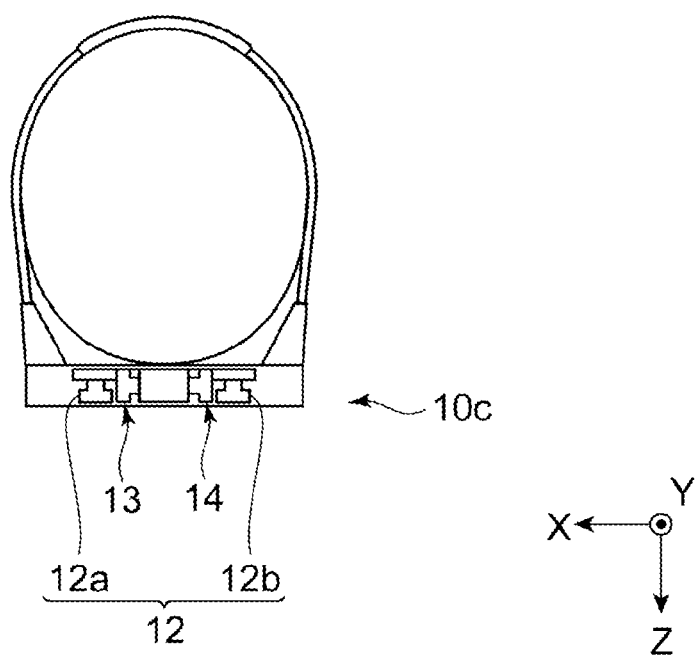
FIG. 6 is a top view depicting how a user wears a distance-measuring device according to a third embodiment of the present invention.
Figure 7:
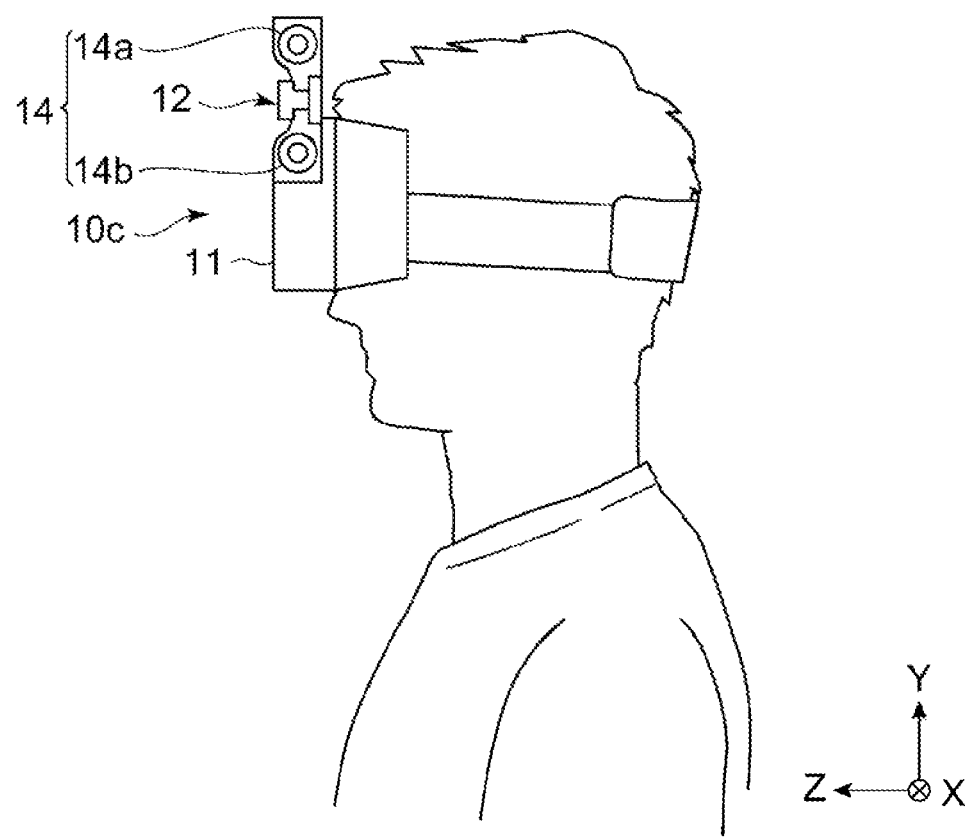
FIG. 7 is a left side view depicting how the user wears the distance-measuring device according to the third embodiment of the present invention.

FIG. 6 is a top view depicting how the user wears the distance-measuring device 10c according to the third embodiment. FIG. 7 is a left side view. It is to be noted from these figures that the present embodiment is characterized in that both the right-side stereoscopic camera 13 and the left-side stereoscopic camera 14 are arranged between the imaging elements 12a and 12b constituting the front stereoscopic camera 12, as depicted in the plan view. This arrangement is possible because the baseline's lengthwise direction (Y-axis) of the two side stereoscopic cameras intersects the baseline's lengthwise direction (X-axis) of the front stereoscopic camera 12.

Figure 8:
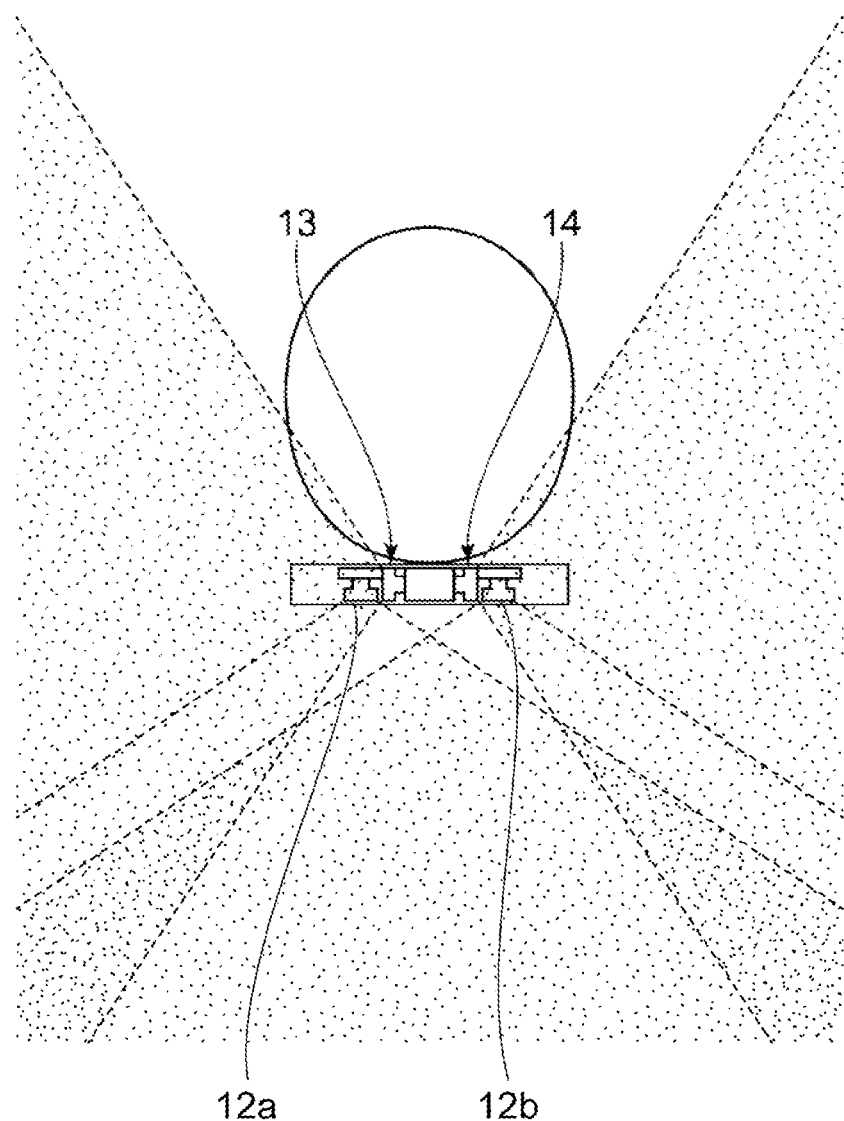
FIG. 8 is a diagram depicting a range for measurement by the distance-measuring device according to the third embodiment of the present invention.
Figure 8:
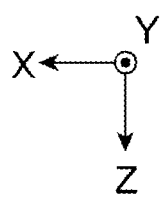

FIG. 8 is a diagram depicting the range for measurement by the distance-measuring device 10c according to the third embodiment. As depicted in the figure, this arrangement reduces the dead angle more than in the case of the first embodiment because the two side stereoscopic cameras are arranged between the imaging elements 12a and 12b of the front stereoscopic camera 12.

Fourth Embodiment

The following is a description of a distance-measuring device 10d pertaining to the fourth embodiment of the present invention. According to the present embodiment, the distance-measuring device 10d is provided with the front stereoscopic camera 12, the right-side stereoscopic camera 13 and the left-side stereoscopic camera1 14 in the same way as the first embodiment. It is additionally provided with a rear stereoscopic camera 15 and a lower stereoscopic camera 16.

Figure 9:
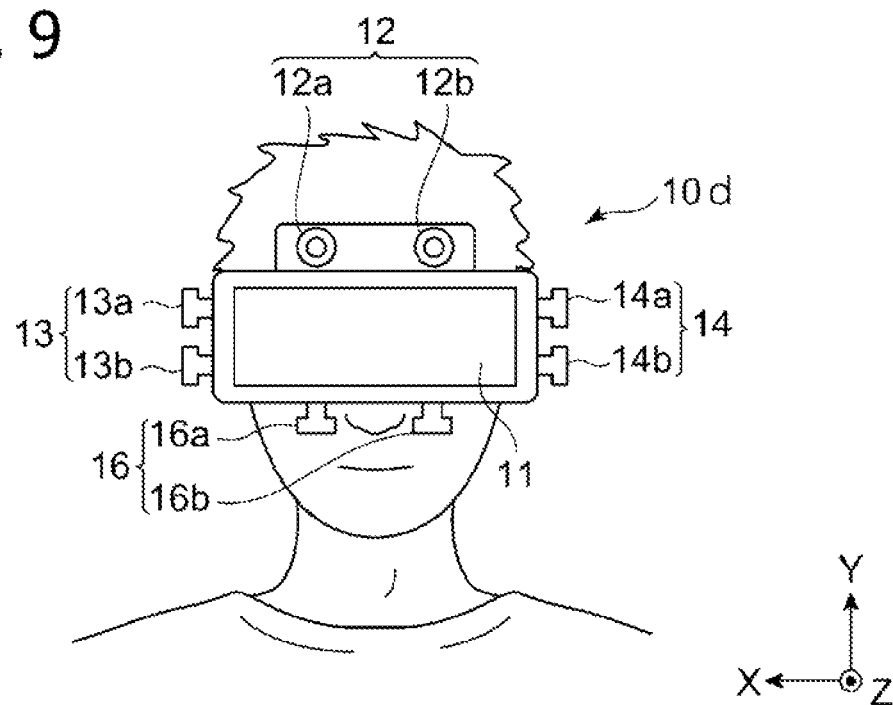
FIG. 9 is a front view depicting how a user wears a distance-measuring device according to a fourth embodiment of the present invention.
Figure 10:
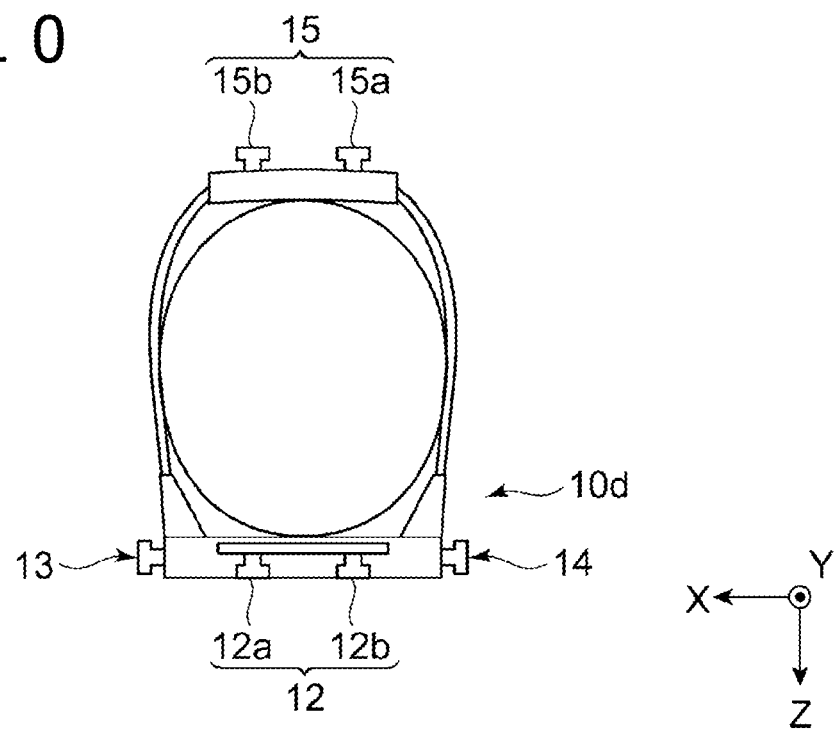
FIG. 10 is a top view depicting how the user wears the distance-measuring device according to the fourth embodiment of the present invention.

FIG. 9 is a front view depicting how the user wears the distance-measuring device 10d according to the fourth embodiment. FIG. 10 is a top view. It is to be noted from these figures that the rear stereoscopic camera 15 is arranged on the rear side of the user. The rear stereoscopic camera 15 includes two imaging elements 15a and 15b which point backward (the negative direction of Z-axis). In addition, the lower stereoscopic camera 16 is arranged under the image-presenting unit 11, and the lower stereoscopic camera 16 includes two imaging elements 16a and 16b which capture images in the nadir direction (the negative direction of Y-axis). Incidentally, both the rear stereoscopic camera 15 and the lower stereoscopic camera 16 have the baseline's lengthwise direction orienting in the X-axis as in the case of the front stereoscopic camera 12.

The distance-measuring device 10d according to the present embodiment makes it possible to measure the distance from it to the object behind and under the user's face. Moreover, it permits the user to detect the movement of his or her hands over a broad range when the user uses the front stereoscopic camera 12, the right-side stereoscopic camera 13, and the left-side stereoscopic camera 14 in combination with the lower stereoscopic camera 16. Also, the lower stereoscopic camera 16 yields the depth map that permits the user to specify his or her position (to see whether he or she is sitting or standing).

The distance-measuring device according to each of the embodiments mentioned above has the stereoscopic cameras which are arranged such that the two side stereoscopic cameras have the baseline's lengthwise direction intersect the plane containing the imaging direction and the baseline's lengthwise direction of the front stereoscopic camera 12. This arrangement reduces the region of dead angle in which each stereoscopic camera cannot measure the distance.

The foregoing descriptions merely illustrate the arrangement of the stereoscopic cameras, and the stereoscopic cameras may be arranged anywhere in any direction (unlike the illustration) so long as the adjoining stereoscopic cameras are arranged such that their baseline's lengthwise directions intersect each other. In addition, the distance-measuring device according to the second or third embodiment may also be provided with the rear stereoscopic camera 15 and/or the lower stereoscopic camera 16. Moreover, the distance-measuring device according to each of the embodiments mentioned above may have a top stereoscopic camera which captures images in the zenith direction.

The foregoing description assumes that each stereoscopic camera is composed of imaging devices of identical type. However, each stereoscopic camera may be composed of imaging devices of different type. For example, the front stereoscopic camera 12 may be composed of imaging elements such as RGB cameras capable of capturing color images. Such imaging elements may be useful to obtain images for other purposes in addition to generating the depth map. For example, if the front stereoscopic camera 12 is used to produce the image which is displayed on the image-presenting unit 11, the user can see the scene (in the form of stereoscopic image) which he or she would see when he or she does not wear the distance-measuring device. In the case of generating the depth map, the color image captured by the RGB camera may be converted into a monochrome image for subsequent processing. The imaging element for color images is not necessarily required for the stereoscopic camera to be only used to produce the depth map. In this case, the imaging elements constituting the right-side stereoscopic camera 13 and the left-side stereoscopic camera 14 may be monochrome cameras (for monochrome images) or infrared cameras.

Also, one stereoscopic camera may be composed of two imaging elements differing in type from each other. For example, one stereoscopic camera may be composed of an RGB camera and a monochrome camera. In this case, the color image captured by the RGB camera may be converted into a monochrome one, which will be used in combination with the monochrome image captured by the monochrome camera, so that the resulting image gives the depth map. Moreover, the color image captured by the RGB camera may be used for other purposes.

The foregoing description assumes that the distance-measuring device is an image-displaying apparatus to be worn on the head. However, the distance-measuring device is not restricted to that of this type. In other words, the distance-measuring device according to the embodiments of the present invention may be constructed from a plurality of stereoscopic cameras which are mounted on a variety of devices, such as the game machine's controller to be held by the user who needs distance information about the surrounding.

REFERENCE SIGNS LIST 10a, 10b, 10c, 10d: Distance-measuring device
11: Image-presenting unit
12: Front stereoscopic camera
13: Right-side stereoscopic camera
14: Left-side stereoscopic camera
15: Rear stereoscopic camera
16: Lower stereoscopic camera

The invention claimed is:

1. A distance-measuring device comprising:
 first and second stereoscopic cameras each to be used to measure a distance to an object included in an imaging range,
 wherein the first stereoscopic camera includes two imaging elements arranged side by side in a first direction,
 wherein the second stereoscopic camera includes two imaging elements arranged side by side in a second direction, the second direction is defined as a direction which intersects a plane containing the first direction and an imaging direction of the first stereoscopic camera,
 wherein the second stereoscopic camera is arranged between the two imaging elements contained in the first stereoscopic camera, as viewed in the direction which intersects the plane,
 wherein the first stereoscopic camera captures an image in a front direction of the distance-measuring device, and
 wherein the second stereoscopic camera captures an image in a sidewall direction of the distance-measuring device.

2. The distance-measuring device according to claim 1, which is worn on a user's head at the time of its use, further comprising: an image-presenting unit to present an image to the user, wherein the first stereoscopic camera captures an image in a frontward direction of the user.

3. The distance-measuring device according to claim 1, wherein the first stereoscopic camera contains the two imaging elements which differ in type from the two imaging elements contained in the second stereoscopic camera.

* * * * *